W. MORRISON.
STORAGE BATTERY CONSTRUCTION.
APPLICATION FILED FEB. 16, 1918.

1,284,746.

Patented Nov. 12, 1918.
2 SHEETS—SHEET 1.

Inventor
William Morrison
By Byrnes Townsend Brickenstein
Attorneys

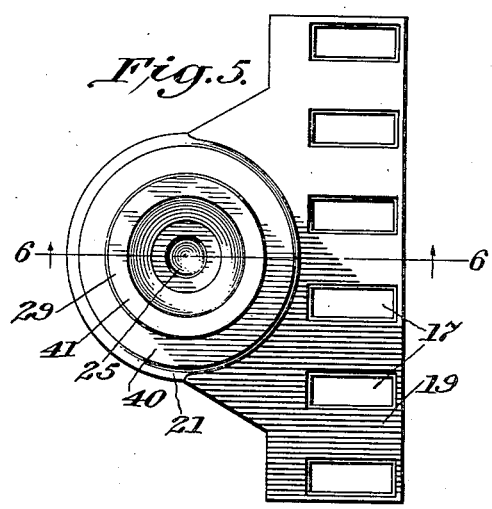
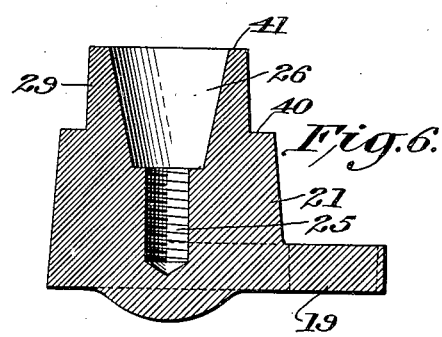
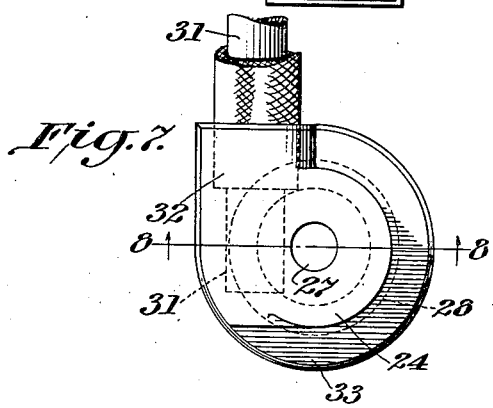
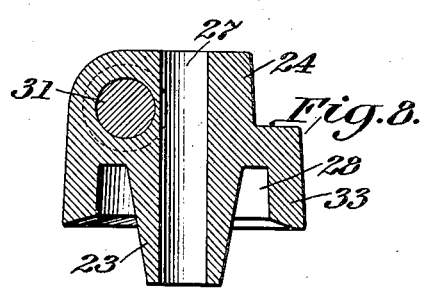

UNITED STATES PATENT OFFICE.

WILLIAM MORRISON, OF CHICAGO, ILLINOIS.

STORAGE-BATTERY CONSTRUCTION.

1,284,746.     Specification of Letters Patent.     Patented Nov. 12, 1918.

Application filed February 16, 1918. Serial No. 217,626.

*To all whom it may concern:*

Be it known that I, WILLIAM MORRISON, a citizen of the United States, residing at Chicago, in the county of Cook and State of Illinois, have invented certain new and useful Improvements in Storage - Battery Constructions, of which the following is a specification.

This invention relates to secondary or storage battery construction, the object of the invention being the provision of improved means whereby the inclosing case, its sealing cover, the battery plates and their attached circuit connectors are so constructed and arranged that they mutually coöperate to prevent injury of any kind to the battery when in use, as on automobiles, and particularly on automobile trucks in which relation the batteries are subjected to jarring and vibration.

The invention further relates to a new construction of connector by which a good electrical connection to the battery plates is made while simultaneously completely sealing the joints in the cover and connector so that leakage of liquid out of or into the battery or connector is completely prevented.

A preferred embodiment of the invention is illustrated in the accompanying drawings, wherein—

Fig. 5 is a plan of the positive pillar strap.

Fig. 6 is a sectional elevation on plane 6—6 of Fig. 5.

Fig. 7 is a plan of the negative outside terminal; and

Fig. 8 is a sectional elevation on plane 8—8 of Fig. 7.

Figure 1:
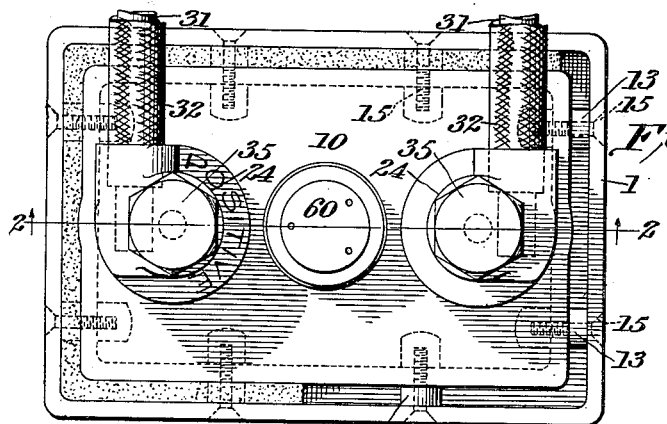
Figure 1 is a plan view of the battery.

Referring to the drawings, 1 represents the container or battery cell, made for example of hard rubber or other appropriate insulating material, 2, 3, 4, 5 indicating the supporting ribs which carry the plates, and which may be formed integral with the body of the cell. 6, 7 designate the plates in position upon the supporting ribs.

As clearly indicated in the figure, the ribs 2, 3, 4, 5 extend across the cell transversely of the plates. Four ribs are shown, those numbered 2 and 4 serving to support one set of plates (for example the positive plate 6), and those numbered 3 and 5 supporting the negative plates 7. In this construction therefore plates of opposite polarity do not rest upon or contact with the same supporting rib or ribs.

The ribs present upper angular (beveled) edges 8, an angle approximating 60° at the apex being suitable. The plates are marginally recessed on their lower edges as indicated at 9, these recesses conforming to the beveled edges of the ribs, and being positioned to engage these edges; the plates of opposite polarity resting, as above described, upon alternate ribs.

The provision of these beveled supporting ribs in combination with conformed marginal recesses in the plates supported upon the ribs, is of particular value in that it allows the relative weight of the plates to be carried by the ribs without rendering the latter liable to deformation or spreading under the weight and impact in service, such as truck work. This is because in the present construction the thrust of the plates, due to their weight as well as the impact of the plates under the vibration of a moving vehicle, is directed definitely inwardly, or approximately normally to the beveled faces of the ribs. The surface of contact between the plates and ribs is made sufficiently large also to prevent skidding or moving of the plate within the cell, which if permitted results in wearing away of the tops of the supporting ribs, breaking of the sealing compound, and other difficulties.

The cover 10 of the cell has a substantially flat top, a downwardly extending portion 11 and a flange 12, the edge of which fits the inner wall of the case 1. I mold integrally with the cover a series of lugs 13, each of which is long enough to extend to the inner wall of the case. The lugs as molded extend to the flange 12, the portion represented by 14 being afterward removed by sawing. There is thus provided a continuous groove between the cover and the case into which sealing material may be poured. Preferably the lugs 13 extend beyond the inner surface of the portion 11, as shown, to thereby afford an adequate bearing for the screws 15 which extend through the upper portion of the side wall of the case into suitable screw-threaded sockets in the lugs 13. The cover is thus rigidly secured to the case and by reason of the clamping connector construction, described below, firmly holds the battery plates against up and down movement.

The connectors are formed of two coöperating clamping portions, which may be termed a "pillar member" 20 and a "head member" 24, these two coöperating members being so constructed and arranged that they both clamp the plates to the cover and make a firm and adequate electrical connection.

As shown in Fig. 6 the pillar portion is so shaped as to have therein a frusto-conical cavity 26 surrounded by an annular wall 29 whose external diameter is such as to fit through an opening in the cover, this wall 29 having at its base a shoulder 40 to engage the bottom of the cover and at its top a bearing surface 41. Beneath the cavity 26 and connecting therewith is a screw-threaded socket 25 for engaging the screw-threaded end portion of bolt 22 having a head 35. The lugs 16 and 17 of the battery plates are burned into apertures in plates 18 and 19 preferably integrally formed with the pillar portion.

Figure 4:
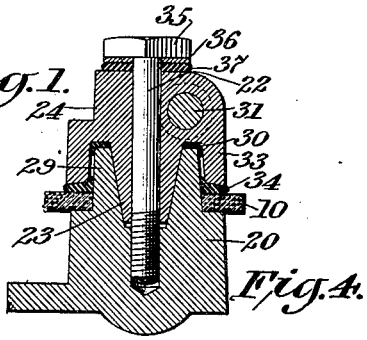
Fig. 4 is a sectional elevation of a modified form of connector construction.
Figure 2:
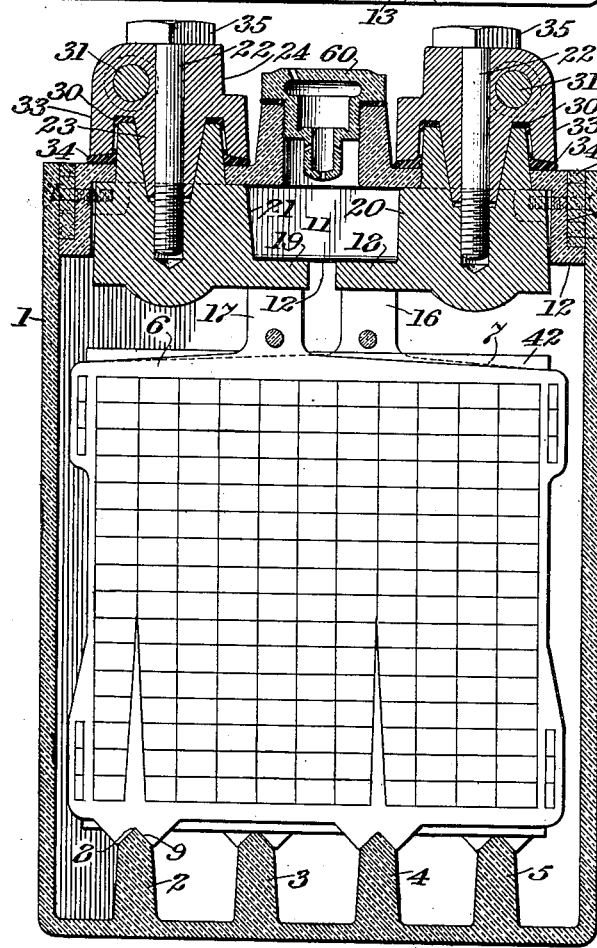
Fig. 2 is a vertical section on plane 2—2 of Fig. 1.
Figure 3:
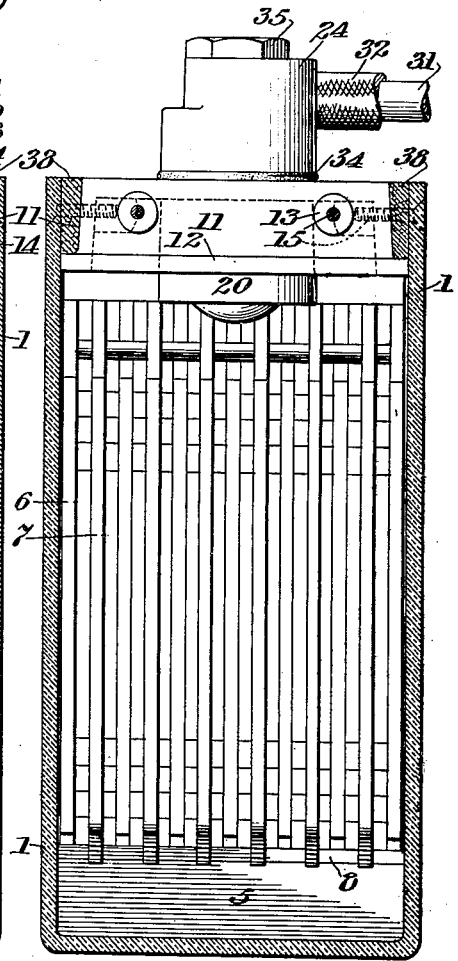
Fig. 3 is an open end elevation, one end of the case being removed.

The head member has a frusto-conical projection 23, corresponding in shape to that of cavity 26, and formed between this projection 23 and the depending flange, 33, is a cavity sufficiently large to receive the annular wall 29 of the pillar portion. The lower annular surface of the flange 33 is preferably beveled, as shown in Figs. 4 and 8.

The cover 11 fits over the annular wall 29, and by interposing elastic sealing washers 30 and 34, at the points indicated, all possibility of leakage of liquid, such as water or acid into the cell or the interior of the connector is completely prevented. The extension of the pillar portion upward above the top of the cover is an advantageous feature of construction in this regard. Ordinarily the sealing washers 30 and 34 will be sufficient to prevent access of liquid into the interior of the connector, but if desired, an additional seal may be used under the head 35 of the bolt, as shown in Fig. 4, this additional seal comprising an annular rubber washer 37 and preferably a rigid washer 36. The cover, in addition to the openings for the upper portion of the pillars, has means, 60, for introducing liquid into the battery.

In practice the groove between the cover and the case is filled with insulating material, 38, such as paraffin wax. 42 is one of the usual separators between the battery plates.

Suitable conductors 31, covered with insulation 32 are cast into the head portion 24, as shown in Fig. 7. As a result of the construction, above described, the battery can be subjected to jolting and vibration without dislodgment or impairment of the plates, since the plates are at their upper ends clamped to the cover, which is in turn firmly secured to the case, while the notched lower ends of the plates engage the ribs on the bottom of the case. At the same time the battery can be readily assembled and taken down, and the connectors, because of their particular construction, not only secure a most efficient wedging electrical connection, but effectively seal the joints between the cover and connector, as well as those between the parts of the connector.

I claim:

1. A storage battery comprising a case, battery plates therein, coöperating means on said case and plates for supporting the plates and preventing sidewise movement thereof, a cover, means for securing the cover to the case, connectors secured to said plates and comprising coöperating clamping parts engaging the upper and lower surfaces of said cover, means for clamping said parts together, and means for sealing the joints between said cover and connectors.

2. A storage battery as claimed in claim 1 having sealing means between the clamping parts of the connector.

3. A storage battery as claimed in claim 1 in which one of the clamping parts of each connector extends through and above the cover.

4. A storage battery connector comprising a shouldered upwardly extending pillar portion having a tapered cavity therein, a head member having a correspondingly tapered projection adapted to extend into said tapered cavity and provided with an annular wall adapted to surround the upper end of the pillar member, and a headed screw-threaded bolt engaging both said members.

5. A storage battery connector comprising a shouldered upwardly extending pillar member having a tapered cavity therein, a head member having a correspondingly tapered projection adapted to extend into said tapered cavity and provided with an annular wall adapted to surround the upper end of the pillar member, sealing means between the top of the pillar member and the head member, and a headed screw-threaded bolt engaging both said members.

6. The combination with an apertured storage battery cover, of a storage battery connector comprising a shouldered pillar member extending upwardly through and fitting said aperture, said pillar member having a tapered cavity therein, a head member having a correspondingly tapered projection adapted to extend into said cavity and provided with an annular wall adapted to surround the upper end of the pillar member, sealing means between the bottom of said annular wall and the cover, and a headed screw-threaded bolt engaging both said members.

In testimony whereof, I affix my signature.

WILLIAM MORRISON.